Aug. 29, 1967  B. J. ALDENHOFF  3,339,107

DIRECT CURRENT POWER SUPPLY

Filed July 1, 1964

INVENTOR.
BERNARD J. ALDENHOFF

United States Patent Office 3,339,107
Patented Aug. 29, 1967

3,339,107
DIRECT CURRENT POWER SUPPLY
Bernard J. Aldenhoff, Oconomowoc, Wis., assignor, by mesne assignments, to Harnischfeger Corporation, West Milwaukee, Wis., a corporation of Wisconsin
Filed July 1, 1964, Ser. No. 379,492
14 Claims. (Cl. 315—141)

This invention relates to a direct current power supply and particularly to a direct current power supply employing gate controlled rectifiers or the like connected in an output circuit for converting an alternating current into a direct current.

Direct current power sources for energizing of certain direct current loads require a particular direct current voltage chaacteristic and nomally must be adjustable. A highly satisfactory and common form of a direct current power source will employ a transformer connected between incoming alternating current power distribution lines and the load to provide an output voltage of a desired characteristic and level. The alternating current output of the transformer is converted to a direct current through the use of suitable rectifying elements; i.e. elements which conduct in a single direction. Silicon diodes and silicon controlled rectifiers which are solid state devices having rectifying properties have found wide application in direct current power sources. Silicon controlled rectifiers are similar to diodes except in addition to the rectifying feature they have an additional control or gate electrode which can control the conducting period of the rectifiers. The present invention is particularly applicable to direct current power sources employing silicon controlled rectifiers and has been found to be a particularly useful improvement in welding power sources. A highly satisfactory welding power source employing silicon controlled rectifiers is disclosed in the copending application of Bernard J. Aldenhoff and John N. Kuhr, Jr., entitled, Arc Power Supply which was filed on Apr. 7, 1964, with Ser. No. 357,936 and assigned to a common assignee herewith. As more fully disclosed in that application, a preferred construction includes a three phase, full wave rectified output having a silicon controlled rectifier in each leg of the output circuit. The output voltage is controlled by controlling the firing or conducting angle of the several silicon controlled rectifiers. In order to provide optimum operation, an inductance is connected in the direct current (D.C.) load circuit to sustain the welding current and voltage during the periods when the silicon controlled rectifiers are in the off or open state; i.e. when they are in the blocking state and prevent current through the branch of the circuit. The inductance in the D.C. circuit stores energy in the form of a magnetic field and returns the energy to the arc through a bypass rectifying circuit to sustain the arc during starting and during the welding cycles and thereby provides highly satisfactory arc characteristics.

Although the welding power source of the above application is completely satisfactory and provides a very reliable welding unit, it has been found that some problems are encountered at the lower current levels. Thus, energy stored in the magnetic field of the stabilizing inductor is dependent on the inductive characteristics of the unit and the current through its windings. When the power source is fired back to provide low currents, the inductance should be of a nature to sustain the arc. However, as the inductance is increased, it appears to interfere with starting and maintaining of an optimum arc action particularly when the power source is employed in recently developed short arc welding processes. In the latter process, the tip of the electrode is caused to engage the work which produces a very sharp or high current between the work and the electrode and results in burning back of the electrode until the arc breaks. This occurs in a rapid, cyclic manner to provide a series of short intermittent arcs established by touching the electrode with the work.

The present invention is particularly directed to a direct current power source which will eliminate the problems encountered by the use of the necessary inductance thereby providing a very reliable power source particularly for arc welding and the like as well as other D.C. power circuits employing silicon controlled rectifiers and the like.

In accordance with the present invention, the silicon controlled rectifiers are connected in a rectifying circuit with the output of a suitable transformer for establishing an output voltage suitable for energizing of the associated arc or other similar load. The present invention however provides one or more diodes connected directly in parallel with at least one of the silicon controlled rectifiers and in series with a portion of the associated transformer secondary. Thus, even though the associated silicon controlled rectifier is fired back to conduct during a portion of a cycle, the paralleled silicon diode will conduct during the time that the silicon controlled rectifier is turned off. The diodes thus function to deliver power from the transformer to the welding system. This reduces the discharging of the stored energy in the inductance in the arc circuit and provides a dual energy source for sustaining the arc between firing periods of the silicon controlled rectifiers. The sustaining diodes also serve to carry any inductive energy from the stabilizing inductor around the silicon controlled rectifiers and thereby prevent damaging voltages from being impressed on the silicon controlled rectifier. However, the total current carried by the diode is relatively low and consequently the diode itself can be a small and relatively inexpensive variety.

The drawing furnished herewith illustrates the several features and advantages as discussed above as well as others which result from the embodiments shown for carrying out the present invention.

Figure 1:
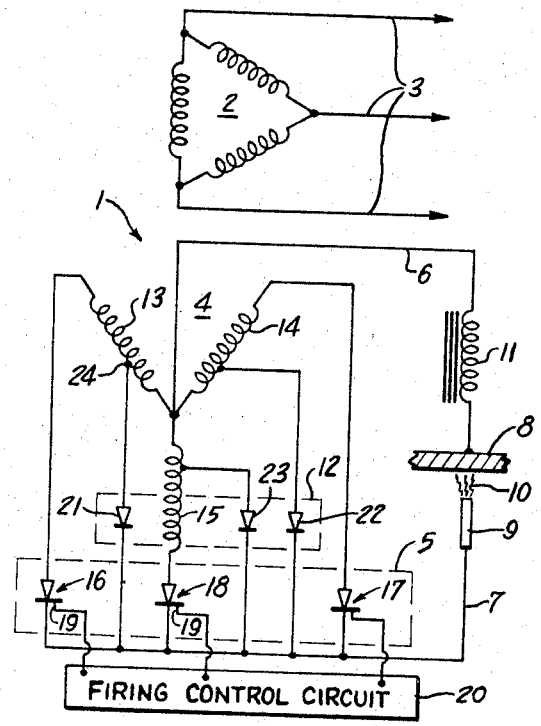
FIG. 1 is a schematic circuit diagram of a three phase, half wave rectifying system employing sustaining diodes in each leg of the circuit.

Referring to the drawing and particularly to FIG. 1, an arc welding circuit is shown including a three phase power supply transformer 1 having a three phase primary winding 2 connected to a set of three phase power lines 3. The transformer 1 further includes a star connected secondary 4 connected in circuit with a silicon controlled rectifier bank 5 to a pair of direct current output leads 6 and 7. A work member 8 is connected to the lead 6 and a consumable electrode 9 is connected to the lead 7 with a welding arc 10 established and maintained therebetween. An inductor 11 is connected in series in lead 6 to provide a stabilizing action as fully discussed in the previously referred to copending application.

In accordance with the present invention, a sustaining diode bank 12 is provided to provide energy transfer in parallel with the rectifier bank 5.

Generally, in the operation of the circuit, the silicon controlled rectifier bank 5 is fired to provide an output voltage sufficient to sustain a preselected welding current and welding voltage. The output voltage established by the bank 5 is thus a series of voltage pulses. The inductor 11 stores energy in the form of a magnetic field for providing energy between voltage pulses and thereby stabilizing the action of the arc 10. In accordance with the present invention, the sustaining diode bank 12 functions to prevent discharging of the inductive energy by furnishing power to the arc circuit whenever the voltage across a portion of the secondary 4 is greater than or equal to that across the inductance. Further, the system is such that when the inductor 11 discharges energy it may be carried by the diode bank 12 to bypass the silicon controlled rectifier bank 5 and thereby prevent application of dangerous voltages to the silicon controlled rectifiers.

More particularly, in the circuit of FIG. 1, the secondary 4 includes phase windings 13, 14 and 15 electrically separated by 120° and interconnected in a star circuit with the common point connected to the D.C. lead 6. The silicon controlled rectifier bank 5 includes three separate silicon controlled rectifiers 16, 17 and 18 respectively connected in circuit between the free ends of the phase windings 13, 14 and 15 and the D.C. lead 7. The silicon controlled rectifiers 16–18 are polarized to conduct from the related windings to lead 7.

Each of the silicon controlled rectifiers 16–18 is similarly constructed and includes a firing electrode 19 connected to a firing control circuit 20; for example, as shown in the previously referred to copending application.

Characteristics of silicon controlled rectifiers are well known and the operation is briefly as follows. The silicon controlled rectifier blocks current flow until the electrode connected to the winding is made positive with respect to the opposite electrode. Even then, the rectifier will not conduct until a breakdown voltage is reached. However, if during the period of this polarity, a current is supplied to the firing electrode 19 from the control circuit 20 it will move or change into a high conduction mode and thereafter maintain that mode independently of the current at the firing electrode as long as the forward bias is maintained across the rectifier. When the polarity is reversed, the rectifier will revert to the forward blocking status. Thus, by proper application of low power signal pulse signals to the gate electrode, a particular portion of the high power alternating current cycle can be impressed across the electrode 9 and the work 8.

In accordance with the present invention, the sustaining diode bank 12 includes three sustaining diodes 21, 22 and 23 connected respectively in parallel with the silicon controlled rectifiers 16, 17 and 18 and a portion of the related phase windings 13, 14 and 15. The interconnection of the several sustaining diodes 21–23, inclusive, into the respective circuits is generally identical and the connection of the sustaining diode 21 is hereinafter described in detail.

The sustaining diode 21 is connected at the positive side to a low voltage tap 24 on a related transformer phase winding 13. The opposite or negative side of the diode 21 is connected directly to the related direct current lead 7 in parallel with a portion of the phase winding 13 and the related silicon controlled rectifier 16. The voltage applied to the sustainer diode is equal to the related transformer voltage and the inductor voltage.

Figure 2:
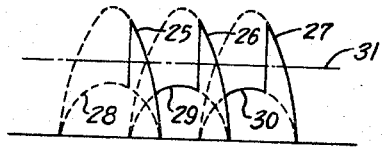
FIG. 2 is a typical voltage wave illustration showing the conduction of the diodes and the silicon controlled rectifiers in the circuit of FIG. 1 under one set of conditions.

In operation, the sustainer diode 21 thus provides a bypass or alternate circuit across the silicon controlled rectifier 16. Normally, the forward breakdown voltage across the sustainer diode 21 is less than that of a silicon controlled rectifier 16. In operation therefore the silicon controlled rectifier 16 will not conduct until a firing pulse is applied to the related firing electrode or gate electrode. During the period that the silicon controlled rectifier 16 is turned off, the sustainer diode 21 conducts and supplies current to the arc 10 with the power being derived by discharge of stored energy from inductor 11 or from the related transformer secondary. As a result, the current or voltage applied to the arc 10 is maintained. Voltage curves are typically shown in FIG. 2 for the three successive cycles associated with phase windings 13, 14 and 15. Three superimposed half-wave cycles 25, 26 and 27 for the respective silicon controlled rectifiers 16, 17 and 18 respectively are shown with that portion of the wave shown in full following the firing of the related silicon controlled rectifier and the dotted portion showing that portion of the voltage wave which is blocked by the corresponding rectifier. The related in-phase half-wave voltage cycles 28, 29 and 30 carried by the sustaining diodes 21–23, inclusive, are shown superimposed on the voltage waves 25–27, inclusive, with corresponding full and dotted line illustration. Voltage cycles 28–30 have a much lower peak magnitude as a result of the tapped connection to the related phase windings 13–15, inclusive. In FIG. 2, the silicon controlled rectifiers 16, 17 and 18 are shown conducting for somewhat less than one-half of each cycle and consequently they would normally create zero gaps between the respective half wave pulses. In the present inveniton, the zero gaps are filled to provide a mean level voltage shown by the horizontal line 31 as a result of inductive current from inductor 11 and a sustaining diode current from the tapped transformer secondary. The power under curve line 31 and above the sustaining diode voltage curve 29 between the curves 25 and 26 of the silicon controlled rectifiers 13 and 14 is due to the inductive power in inductor 11.

When the voltage of silicon controlled rectifier 25 drops to the mean level line 31, the voltage tends to decrease below the mean level and inductor 11 begins to discharge into the circuit to maintain the current until the voltage curve 25 intersects with the sustaining diode curve 29 of the adjacent sustaining diode 22. The conduction of the sustaining diode as shown by curve 29, in part, results from the fact that the sustaining diode 22 may conduct when the related silicon controlled rectifier 17 is polarized by the main winding 14 in a direction to conduct but does not conduct because the voltage is not sufficient to overcome the forward breakdown voltage and a firing pulse has not yet been applied. Further, as long as another silicon controlled rectifier is firing, the other two silicon controlled rectifiers and the related diodes are back biased such that they may not conduct until the fired silicon controlled rectifier voltage drops to the level of the sustaining diodes; i.e. the point of intersection of the two voltage waves. The sustaining diode then does conduct and impresses a sustaining voltage until the related silicon controlled rectifier is fired.

Each of the zero gaps is thereby filled with energy in part from the action of the sustaining diodes 21–23 wherein the related power output is from the transformer and in part from the discharging of the energy stored in the inductor 11. In essence, the sustaining diodes 21–23 allow the inductor to discharge its stored energy until voltage appearing across the inductor equals the voltage appearing at the low voltage tap. At that point, the transformer secondary 4 provides energy through the sustaining diode and maintains the inductor 11 at the selected discharge or minimum value. For example, each diode 21–23 may be connected to a 12-volt tap on the related secondaries 13–15 in parallel with the silicon controlled rectifiers 16–18. The voltage applied to the arc 10 will never drop below this 12 volts.

The total current carried by the diodes 21–23 will be quite low in relation to the total current of the unit. Consequently, the rating of the diode can be correspondingly small to allow use of relatively inexpensive diodes.

This new circuit thus reduces the sustaining power necessarily supplied by the inductor and therefore minimizes or reduces the value of inductance necessary in the circuit at low currents. It has been found that this provides a highly satisfactory result particularly in connection with short arc welding and the like.

Figure 3:
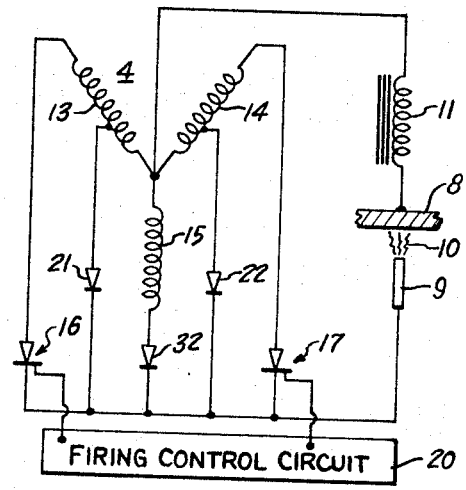
FIG. 3 is a schematic circuit diagram similar to FIG. 1 modified to employ a single sustaining diode.
Figure 4:
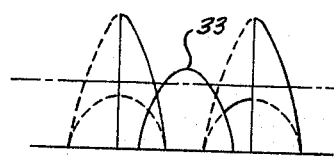
FIG. 4 is a voltage wave illustration for the embodiment of FIG. 3.

The invention has been applied in FIG. 1 to a three phase, half-wave circuit with a sustaining diode connected in each phase. However, a lesser number of sustaining diodes may be employed in one or two legs of a three phase circuit to provide a sustaining energy during the related zero gaps. The effect is to reduce the mean level of the voltage supplied to the arc 10 during a complete cycle of the three phase system and creates a somewhat greater ripple component. For example, the circuit in FIG. 3 is generally similar to that of FIG. 1 but employs a pair of sustaining diodes corresponding to diodes 21 and 22 of FIG. 1. Corresponding elements in the circuits of FIGS. 1 and 3 are similarly numbered with the circuit changes in the secondary winding 15 resulting from elimination of diode 23.

In FIG. 3, a diode 32 has been substituted for the silicon controlled rectifier 18 in series with the phase winding 15. The circuit operates in basically the manner described above for FIG. 1 whenever the voltage waves of windings 13 and 14 are providing the power. Interposed between these two waves however is the voltage wave 33 for the diode 32 which conducts when the voltage wave of winding 15 is to supply the voltage. As noted, the peak value of the voltage of winding 15 need only be approximately that of the desired mean level as the inductor 11 and adjacent diode will fill the remaining power gap.

Figure 5:
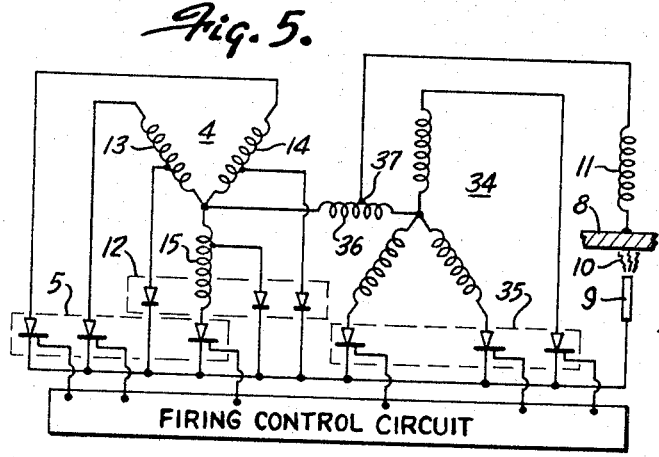
FIG. 5 is a schematic circuit diagram similar to FIG. 1 illustrating a three phase, full wave rectifying system.

The present invention may be employed with three phase full-wave circuits, single phase circuits or any other circuit employing silicon controlled rectifiers and the like. Thus, a full wave circuit is shown in FIG. 5 employing an additional three phase secondary 34 connected in circuit with a half wave circuit corresponding to FIG. 1 and therefore correspondingly numbered. A bank of silicon controlled rectifiers 35 connect the secondary 34 to leads 6 and 7 and is polarized to conduct in the same direction as the bank 5 of the secondary 4. An interphase transformer 36 interconnects the star points of the secondaries 4 and 34 and is connected to the D.C. lead 6 at a center tap 37.

The circuit of FIG. 5 generally operates in the same manner as the three phase, half-wave system except that the three phase, full-wave system provides six voltage pulses or two pairs of overlapping pulses via the silicon controlled rectifier banks 5 and 35 for each complete cycle of the three phase system. This substantially reduces the zero voltage gaps even with the silicon controlled rectifiers fired back to conduct less than 90° of each full voltage cycle. Consequently, the power which must be supplied by the sustaining diodes 21–23 as well as the inductor 11 is substantially less.

Figure 6:
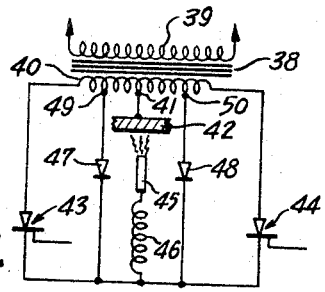
FIG. 6 is a schematic circuit diagram illustrating a single phase system employing a pair of sustaining diodes.

In FIG. 6, a single phase, full-wave D.C. arc supply system is shown employing sustaining diodes in accordance with the present invention.

In FIG. 6, a single phase transformer 38 is illustrated having a single phase primary winding 39 connecting to a pair of incoming power supply lines and having a secondary 40 with a center tap 41 connected to the work 42. The opposite ends of the secondary 40 are connected in series with corresponding silicon controlled rectifiers 43 and 44 to an electrode 45 in series with an inductor 46. In accordance with the present invention, sustaining diodes 47 and 48 are respectively connected at quarter tap points 49 and 50 and to the inductor 46. Thus, in the operation, the single phase full wave circuit provides continuous voltage pulses with the alternate halves of the secondary 40 being alternately passed by the silicon controlled rectifiers 43 and 44. The portion of the voltage applied across the electrode and the work is controlled by the firing of the silicon controlled rectifiers 43 and 44, as in the previous embodiments. As a result, zero voltage gaps normally are created between the voltage pulses. The inductor 46 however discharges to maintain the arc until the voltage of the inductor equals the voltage of the portion of secondary 40 applied across the paralleled sustaining diode 47 or 48. At that time, the corresponding sustaining diode conducts and provides power to the arc; thereby maintaining the arc and a minimum inductive energy in the magnetic field of the inductor 46.

Figure 7:
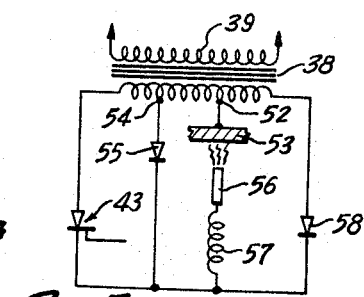
FIG. 7 is a schematic circuit diagram of a single phase unbalanced circuit with a single silicon controlled rectifier and a single sustaining diode.

A similar unbalanced single phase circuit is shown in FIG. 7 with corresponding elements in the embodiments of FIGS. 6 and 7 similarly numbered. In the embodiment of FIG. 7, the single phase secondary winding 51 of the transformer 38 is unbalanced with a tap 52 connected to the work 53 and a tap 54 connected to one side of a sustaining diode 55. The opposite side of diode 55 is connected to the electrode 56 in series with the inductor 57. Additionally, in FIG. 7, the silicon controlled rectifier on the low voltage end or side is replaced with a diode 58. During the one half cycle, conduction will be controlled by firing of the silicon controlled rectifier 43 and the conduction of the related sustaining diode 55. During the opposite half cycle, the diode 58 will provide a voltage pulse to maintain the arc. In essence, the circuit of FIG. 7 generally corresponds to the previously described phase circuits of FIG. 3 wherein a main diode and a pair of sustaining diodes were employed.

In summary, the present invention provides a controllable direct current source providing a chopped voltage output for controlling and sustaining a current to a load with the effects of the chopped wave output remaining eliminated in a ready and inexpensive manner. Although the invention has been shown in a plurality of three phase and single phase circuits, the concepts and advantages of the invention may be employed with any direct current circuit employing silicon controlled rectifier means or like devices for output control where it is desired to maintain power to the load prior to firing of the rectifier means. The current carrying capacity of the diodes is relatively small and consequently inexpensive and low rated diodes can be employed.

Various modes of carrying out the invention are contemplated as being within the scope of the following claims particularly pointing out and distinctly claiming the subject matter which is regarded as the invention.

I claim:

1. In a direct current power supply employing an alternating current power means source and main power rectifying means having controllable conduction periods to produce a chopped output wave,
    a pair of output leads terminating in terminals for connection to a load and to the rectifying means in series and establishing a direct current through the load with the complete load current being conducted by said two output leads,
    inductive means having a winding serially connected in one of said leads and carrying the entire current in the leads to store energy and maintain a current between conducting periods of the rectifying means, and
    low voltage sustaining rectifier means connected in series circuit with the inductive means and in parallel circuit with the rectifying means to provide auxiliary sustaining power when the inductive energy drops to a selected level.

2. The power supply of claim 1 having,
    an input transformer having a secondary connected in series with the output leads and therefore the inductive means to produce a controllable output voltage, and said sustaining rectifier means connected in parallel with a portion of the secondary and the main power rectifying means.

3. The direct current power supply of claim 1 wherein, said rectifying means are rectifier silicon controlled means.

4. In a three phase arc power supply for establishing and maintaining an arc current to an arc gap means,
    a three phase transformer having a star connected secondary with a first direct current output lead connected to the center of the star and to the arc gap means with said direct current output lead conducting the total arc current, a bank of similarly polarized rectifiers connecting the free ends of the secondary to a second direct current output lead connected to the arc gap means, some of said rectifiers having a control gate, an inductor having a winding connected in series in the first direct current output lead and carrying the same total arc current as carried by said output lead, said inductor being selected of a value to maintain current flow through said arc gap means between conducting periods of the rectifiers, and sustaining diode means connected one each in parallel with each rectifier having a control gate in series with a selected subportion of the corresponding secondary.

5. The power supply of claim 4 wherein the rectifiers having a gate are silicon controlled rectifiers and the diode means are silicon diodes.

6. In a three phase power supply for establishing and maintaining a load, a three phase transformer having a star connected secondary with a first direct current output lead connected to the center of the star, a bank of similarly polarized rectifiers connecting the free ends of the secondary to a second direct current output lead, some of said rectifiers having a control gate, and inductor connected in series in the first direct current output lead, said inductor being selected of a value to maintain current flow between conducting periods of the rectifiers, sustaining diode means connected one each in parallel with each rectifier having a control gate in series with a selected subportion of the corresponding secondary, and said transformer having a second three phase secondary connected in circuit with the first secondary and the first output lead by an interphase transformer, said three sustaining diode means constituting the sole sustaining diodes in the supply circuit.

7. In a three phase arc welding power supply for establishing and maintaining an arc between a pair of members, a three phase transformer having a star connected secondary with a first direct current output lead connected to the center of the star and to the arc gap means with said direct current output lead conducting the total arc current, a bank of silicon controlled rectifiers connecting the free ends of the secondary to a second direct current output lead connected to the arc gap means, an inductor having a winding connected in series in the first direct current output lead and carrying the same total arc current as carried by said output lead, said inductor being selected of a value to maintain current flow through said arc gap means between conducting periods, and three sustaining diode means connected one each in parallel with a silicon controlled rectifier in series with a small portion of the corresponding secondary.

8. A three phase arc welding power supply in accordance with claim 7 having a second three phase secondary connected in circuit with the first secondary and the first output lead by an interphase transformer, said three sustaining diode means constituting the sole sustaining diodes in the supply circuit.

9. In a single phase power supply for creating and maintaining a direct current load and having rectifiers connecting the output of a transformer to the load leads, at least one of the rectifiers being gate controlled, the improvement in the circuit comprising, an inductor connected in series with the load leads to sustain current flow between conducting period of the rectifiers, and sustaining diodes connected across each rectifier being gate controlled in series with only a portion of the corresponding transformer connection.

10. In a single phase power supply for establishing and maintaining a load, a single phase transformer having a multiple tapped secondary, one tap of which is connected to a direct current output lead, rectifiers connected to the secondary on opposite sides of the direct current output lead and interconnected to a second direct current output lead, at least one of said rectifiers being gate controlled, of said rectifiers being gate controlled, sustaining diode means connected between the second output lead and a tap on the secondary between the first output lead and the connection to the rectifier being gate controlled, and an inductive means connected in the second output lead to the load side of the diode means.

11. In a single phase power supply for establishing and maintaining a load, a single phase transformer having a multiple tapped secondary, one tap of which is connected to a direct current output lead, silicon controlled rectifiers connected to the secondary on opposite sides of the direct current output lead and interconnected to a second direct current output lead, sustaining diode means connected between the second output lead and a tap on the secondary removed from the first output lead, and an inductance means connected in the second output lead to the load side of the diode means.

12. In a single phase power supply for establishing and maintaining a load, a single phase transformer having a multiple tapped secondary, silicon controlled rectifiers connected to the ends of the secondary and interconnected to form a direct current output between the center of the secondary and the common rectifier junction, load leads connected to center of the secondary and to the rectifier junction, sustaining diode means connected in parallel with the rectifiers and a portion of the secondary, and an inductive means connected in the second output lead to the arc side of the diode means.

13. The power supply of claim 12 wherein said diode means are connected to quarter points on the transformer secondary.

14. In a power supply for establishing and maintaining a load, a transformer having a tapped secondary, a silicon controlled rectifier connected to the end of the secondary, a diode connected to the opposite end of the secondary and to the rectifier, a pair of output leads, one being connected to the connection of the rectifier and the diode and the second to a tap on the secondary, the tap being off center to the diode end of the secondary, an inductor connected in series in the second output lead, and a sustaining diode connected in parallel with the silicon controlled rectifier and a portion of the adjacent connected secondary.

References Cited
UNITED STATES PATENTS 3,113,259  12/1963  Walker _____ 321—24

JOHN F. COUCH, *Primary Examiner.*

S. WEINBERG, *Assistant Examiner.*